United States Patent [19]

Ono

[11] Patent Number: 4,867,250

[45] Date of Patent: Sep. 19, 1989

[54] PNEUMATIC IMPACT IMPARTING TOOL

[75] Inventor: Akira Ono, Hatoyama, Japan

[73] Assignee: Ritt Corporation, Japan

[21] Appl. No.: 85,773

[22] Filed: Aug. 17, 1987

[30] Foreign Application Priority Data

Aug. 18, 1986 [JP] Japan ................................ 61-191698

[51] Int. Cl.[4] ................................................ B23B 45/16

[52] U.S. Cl. ........................................ 173/93; 173/122

[58] Field of Search ......................... 173/93.5, 123, 93; 81/464, 465

[56] References Cited

U.S. PATENT DOCUMENTS

| | | | |
|---|---|---|---|
| 2,556,163 | 6/1951 | Beeson et al. | 173/123 X |
| 3,018,674 | 1/1962 | Kohler | 173/123 X |
| 3,174,597 | 3/1965 | Schaedler et al. . | |
| 3,610,344 | 10/1971 | Schoeps | 173/93.5 |
| 4,313,505 | 2/1982 | Silvern | 173/93.5 |
| 4,585,078 | 4/1986 | Alexandrov et al. | 173/93.5 |

*Primary Examiner*—Frank T. Yost
*Assistant Examiner*—Willmon Fridie, Jr.
*Attorney, Agent, or Firm*—Lorusso & Loud

[57] ABSTRACT

An improved pneumatic impact imparting tool includes a follower which is slidably accommodated in a recess formed on the inner end part of a rotor in a pneumatic motor. The follower is formed with a projection for moving a ball around a cam face as it is rotated together with the rotor. When the ball reaches the peak of the cam face, the follower is displaced in the axial direction and enters a recess formed on the inner end part of an anvil and collides therein against stoppers formed in the recess. Thus, rotational movement of the rotor is transmitted to the anvil in the form of intermittent turning movement of the latter.

5 Claims, 6 Drawing Sheets

PNEUMATIC IMPACT IMPARTING TOOL

BACKGROUND OF THE INVENTION

1. Field of the Invention

The present invention is concerned with improvement in or relating to a pneumatic impact imparting tool and more particularly to a pneumatic impact imparting tool in which the mechanism for converting rotational movement of a pneumatic motor at a constant rotional speed into intermittent turning movement of an anvil is made integral with the motor.

2. Description of the Prior Art

To facilitate understanding of the present invention a typical conventional pneumatic impact imparting tool as disclosed in U.S. Pat. No. 3,174,597 will be described below with reference to FIGS. 4 to 7. Basically, the conventional pneumatic impact imparting tool is constituted by a combiantion of a pneumatic motor adapted to be rotated by compressed air, an anvil and a mechanism for converting rotational movement of the pneumatic motor into intermittent turning movement of the anvil. Incidentally, FIG. 4 is a vertical sectional view of the conventional pneumatic impact imparting tool.

As is apparent from FIG. 4, the rotational force transmitting means comprises mainly a pneumatic motor 10 and a hammer 12. Specifically, as seen in FIG. 5, the pneumatic motor 10 includes a column-shaped rotor 14 having a shaft 13 extended therethrough, a cylinder 16 surrounding the rotor 14, a rear plate 18 secured to the lower end of the cylinder 16 and a front plate 20 secured to the upper end of the same to airtightly close the cylinder 16. To allow for rotation of the shaft 13, both the rear plate 18 and the front plate 20 are fitted with bearings 22 and 23. The rotor 14 is formed with a plurality of radially extending grooves 24 in an equally spaced relationship on the outer circumference thereof and each of the grooves 24 extends in parallel with the shaft. Further, a vane 26 is inserted in each of the grooves 24 in such a manner that it slides in the radial direction relative to the shaft 13. The shaft 13 of the rotor 14 projects through the front plate 20 and the part of the shaft 13 projecting outwardly of the front plate 20 is formed with a plurality of spline teeth 28. Importantly, the inner space of the cylinder 16 is so designed that the center axis of the hollow space is located offset from the center axis of the outer wall of the cylinder 16. Owing to the eccentric construction of the pneumatic motor 10, the rotor 14 is rotated by means of the vanes 26 as compressed air is introduced into the hollow space between the cylinder 16 and the rotor 14 by utilizing known means.

The hammer 12 includes an anvil 34 adapted to be intermittently turned by rotation of the motor 10 and means for converting rotation of the motor 10 into intermittent turning movement of the anvil 34. Further, the hammer 12 includes a cylinderical cage 36 having a closed lower end. A central opening through the closed end of the cage 36 is formed with a plurality of internal spline grooves adapted to engage the spline teeth 28 on the shaft 13 of the rotor 14. Since the cage 36 engages the rotor 14 via the splines it is caused to rotate at the same rotational speed as that of the rotor 14. The anvil 34 is formed with a plurality of spline teeth 38 at its lower end as seen in the drawing. As is best seen in FIG. 7, wings 40 extending in the leftward and rightward directions in the drawing are made integral with the anvil 34 at diametrically opposed positions. Both the spline teeth 38 and the wings 40 are accommodated in the interior of the cage 36. A spindle guide 42 against which the lowermost end of the anvil 34 abuts is secured to within the bottom of cage 36. An annular groove is formed on the outer surface of the spindle guide 42 facing the inner wall of the cage 36. A ball 44 is disposed at a predetermined position on the annular groove (at a predetermined position where it turns together with the cage 36).

A cam member 46 as shown in FIGS. 6 and 7 has a cylindrical configuration and a plurality of spline grooves adapted to come into engagement with the spline teeth 38 on the anvil 34 are formed on its cylindrical inner wall. The cam member 46 is adapted to slide axially with respect to the anvil 34 while maintaining engagement with the spline teeth 38 of the anvil 34. The lower end part of the cam member 46 constitutes cam face 48 with which the ball 44 is brought in contact and the cam face 48 exhibits a hill-shaped contour as seen from the side. Further, an outwardly projecting annular boss portion 50 is integral with the cam member 46 around its outer cylindrical surface. As shown in FIG. 8, the cage 36 is formed with two semicylindrical grooves 53 which accommodate 52 for sliding in the axial direction. Each of the pins 52 is formed with an annular recess 54 which comes in engagement with the annular boss portion 50 of the cam member 46. Accordingly, the pins 52 are caused to slide along the grooves 53 on the cage 36 as the cam member 46 is slidably displaced up and down. Further, a spring 56 is disposed in the hollow space between the surface of the cam member 46 located opposite to the cam face 48 and the wings 40 whereby the cam member 46 is normally urged toward the motor 10 under the effect of the resilient force of the spring 56. A cover 58 is tightly fitted into the top opening of the cage 36 in order to retain and the anvil 34 from within cage 36.

Next, description will be made below as to how rotational movement of the rotor 14 at a constant rotational speed is converted into intermittent turning movement of the anvil 34. As the rotor 14 is rotated, the cage 36 is caused to rotate and the ball 44 accommodated at the predetermined position in the cage 36 turns together with the cage 36. When the ball 44 comes in contact with the one inclined part of the cam face 48, the cam member 46 is slidably displaced toward the wings 40 by means of the ball 44 against resilient force of the spring 56. As the cam member 46 is slidably displaced in that way, a pair of pins 52 are also slidably displaced toward the wings 40 together with the cam member 46. As a result, the upper part of each of the pins 52 is projected upwardly into the area through which the wings 40 rotate. When the cage 36 (pin 52) is rotated to the point where the pins 52 are moved upwardly, the pins 52 are brought in abutment against the wings 40, causing the anvil 34 to be turned (see FIG. 7). Thereafter, the ball 44 moves over the hill top of the cam face 48 and thereby the cam member 46 is slidably displaced downwardly to the original position under the resilient force of the spring 56. At the same time the pair of pins 52 are displaced downwardly to the position where they do not contact the wings 40.

The cam member 46 does not slide axially until the ball 44 again contacts the inclined part of the cam face 48 after has moved over the hill top of the same. Then, the same operation as mentioned above is repeated when the ball 44 comes in contact with the inclined part of the cam face 48.

As will be readily apparent from the above description, the conventional pneumatic impact imparting tool is so constructed that the ball 44 carries out planetary movement as the motor 10 is rotated, the cam member 46 is slidably displaced in the axial direction by means of the ball 44, a pair of pins 52 are also slidably displaced in the axial direction in accordance with sliding movement of the cam member 46 and then the anvil 34 is intermittently turned by impact of the pins 52 against the wings 40 of the anvil 34. Namely, the cam member 46 is slidably displaced by means of the ball 44 and the pins 52 are then caused to slide together with the cam member 46.

Due to the above described, the length as measured from the ball 44 to the anvil 34 is equal to summation of the length of the cam member 46 and the length of the pins 52 (excluding the length of the area where the cam member 46 partially overlaps the pins 52 partially). As a result, the whole axial length of the pneumatic impact imparting tool is extended to accommodate.

As mentioned above, the anvil 34 is subjected to impact by pins 52. The small diameter of the pins 52 and the annular recess 54 for slidably displacing them while they are operatively engaged with the cam member lead to another drawback, i.e. breakage of the pins 52, particularly at the annular recess 54 of each of the pins 52.

SUMMARY OF THE INVENTION

The present invention has been made with the foregoing background in mind and its object resides in providing a pneumatic impact imparting tool which assures a reduced overall length and increased strength of an anvil impacting member. In the present invention the follower which impacts the anvil is adapted to slide in direct contact with a ball and is made in an integral structure.

To accomplish the above object there is provided according to the present invention a pneumatic impact imparting tool of the type including a rotor in a pneumatic motor adapted to be rotated by compressed air, a ball adapted to carry out planetary movement as the rotor is rotated, an axial recess formed in the inner end part of the rotor, a follower accommodated in the recess for axial reciprocation, the follower being rotated together with the rotor, an anvil adapted to be intermittently turned under the effect of impact imparted by the follower, an axial recess formed on the inner end part of the anvil so that the follower may enter into the recess for impacting the anvil, a cam member for axially displacing the follower in operative association with the ball when the follower impacts the anvil, the cam member being operatively connected to the anvil, and urging means for normally urging the follower toward the rotor, wherein the improvement is that the follower comprises a column-shaped portion and a pair of integral wings and the cam member comprises a cam disc with an inverted V-shaped cam projected therefrom toward the anvil and a rod extends through the follower into engagement with the anvil so that the ball is held in the space as defined between the follower and the cam disc.

The ball rides on the cam face of the cam member between it and the follower. The cam member is operatively associated with the anvil and it is rotatable separately from the follower. The follower is rotated by the rotor and it is formed with a projection for moving the ball through a planetary path as the rotor is rotated. As the ball climbs the hill portion of the cam member, the follower is slidably displaced axially into a recess formed on the inner end of the anvil whereby a pair of wings carried by the follower collide against stopper portions in the recess of the anvil. Collision of the follower against the stoppers causes the anvil to be turned intermittently.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings in which.

DESCRIPTION OF THE PREFERRED EMBODIMENT

Figure 2:
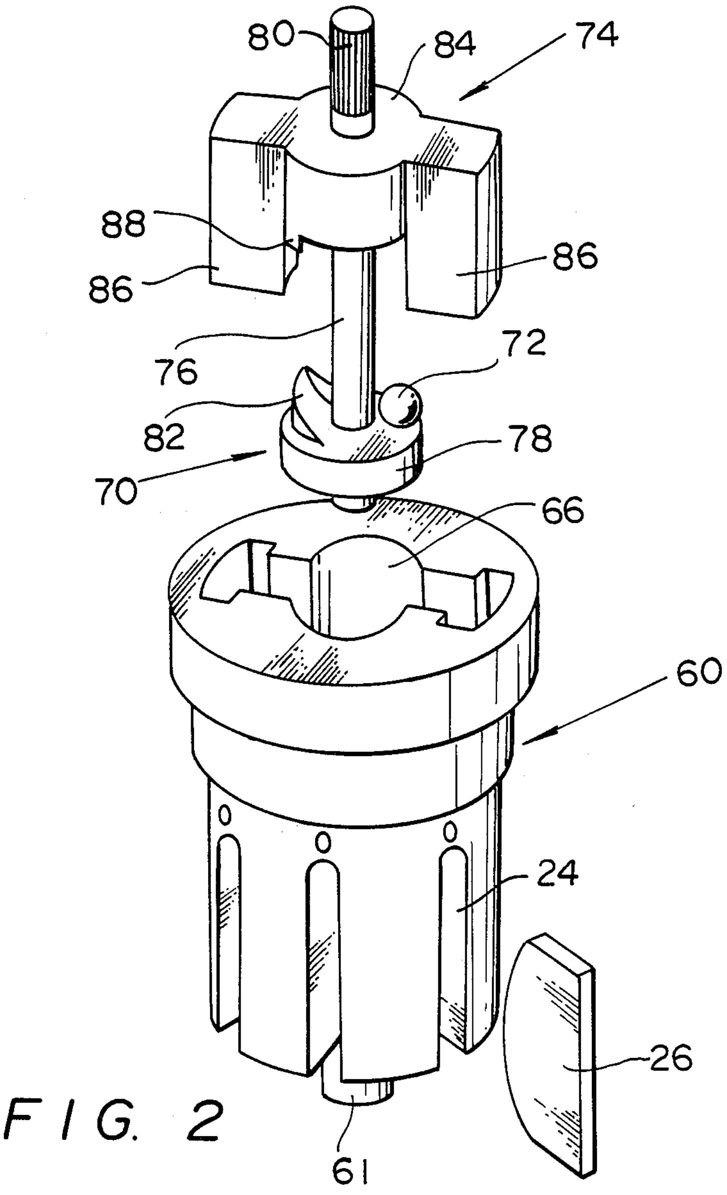
FIG. 2 is a perspective view illustrating means for converting rotational movement of a rotor into intermittent turning movement of an anvil as well as the rotor in the disassembled state.
Figure 3:
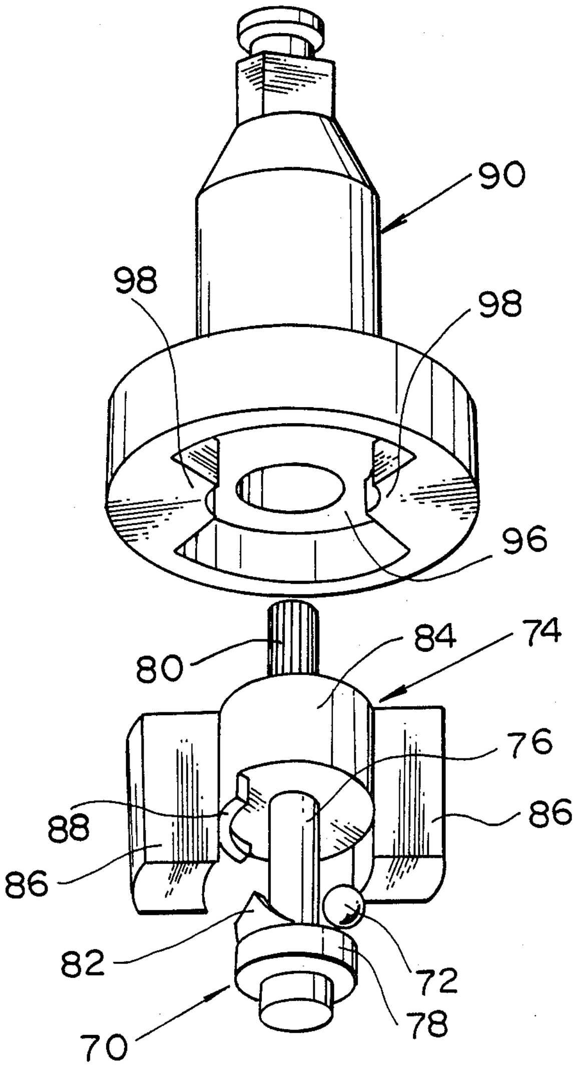
FIG. 3 is a perspective view illustrating an anvil and the aforesaid means for converting rotational movement of the rotor into intermittent turning movement of the anvil in a disassembled state.
Figure 4:
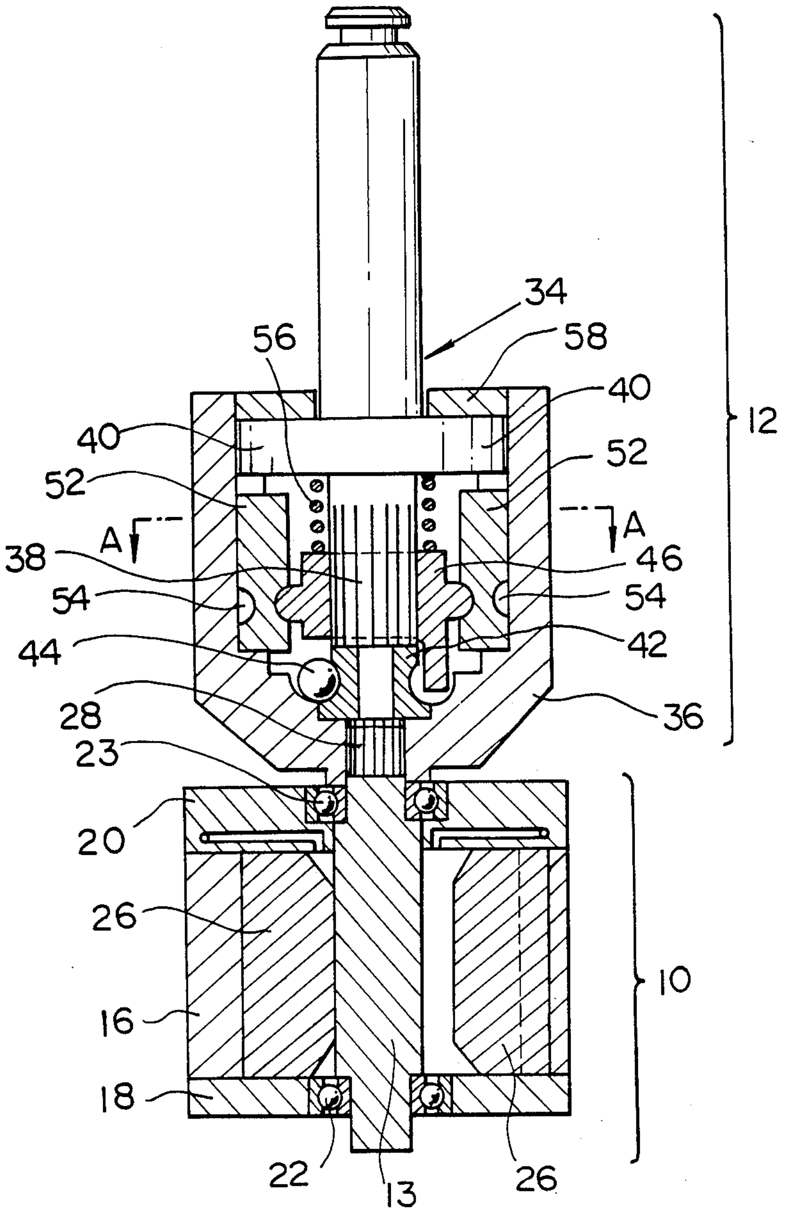
F I G. 4 (PRIOR ART)
FIG. 4 is a vertical sectional view of a conventional pneumatic impact imparting tool.
Figure 5:
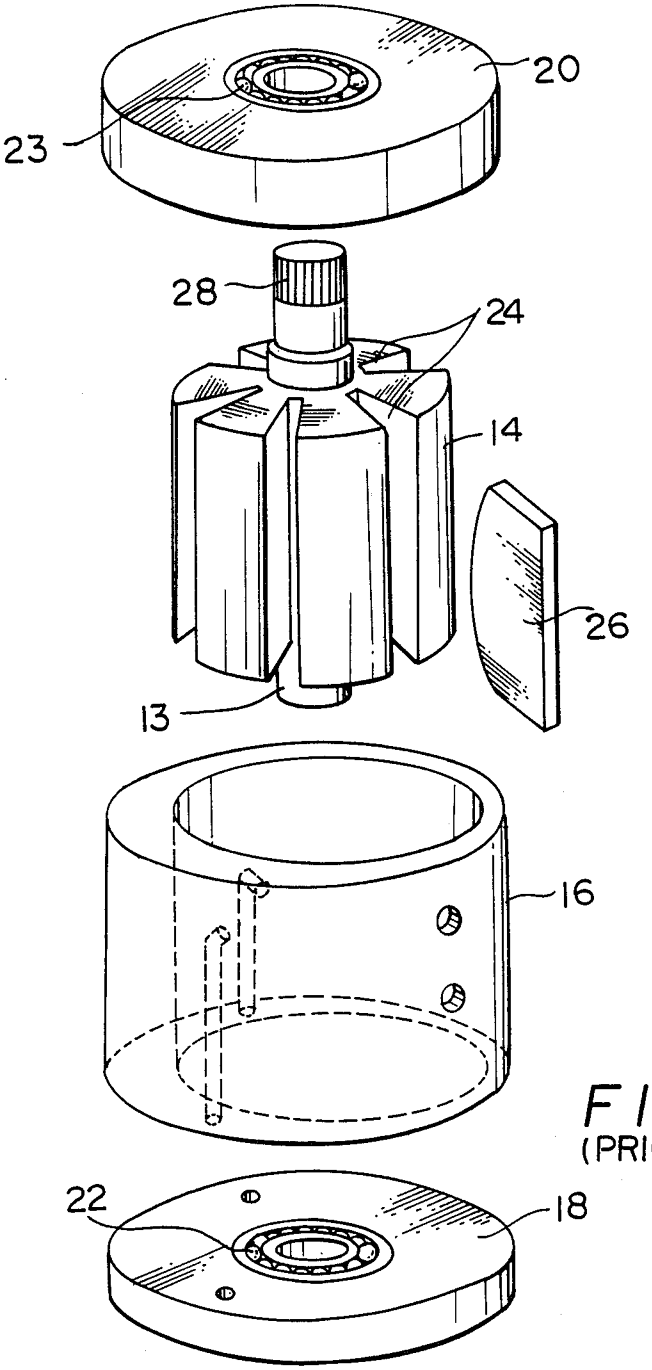
FIG. 5 (PRIOR ART)
FIG. 5 is a perspective view of a conventional rotor in a pneumatic motor, shown in a disassembled state.
Figure 6:
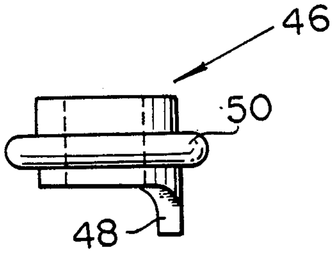
FIG. 6 (PRIOR ART)
FIG. 6 is the side view of the cam member shown in FIG. 4.
Figure 7:
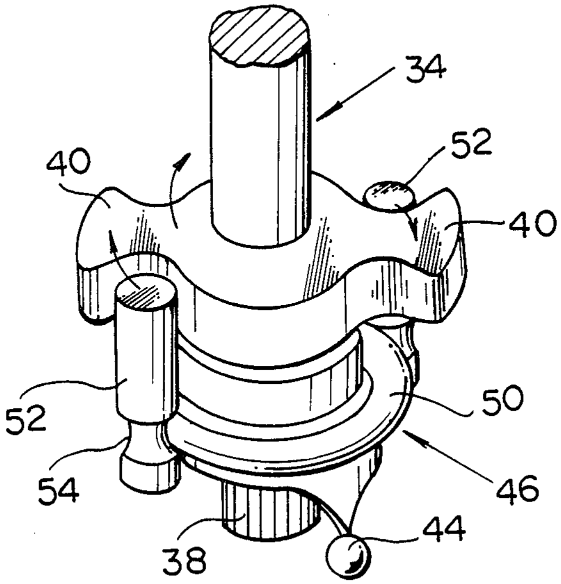
FIG. 7 (PRIOR ART)
FIG. 7 is a perspective view illustrating the working relationship between the anvil, the cam member and the pins in FIG. 4.
Figure 8:
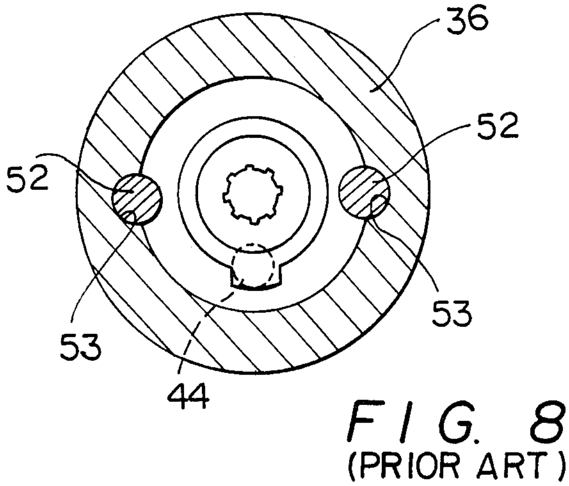
FIG. 8 (PRIOR ART)
FIG. 8 is a cross-sectional view of the cage and the pins taken along line A—A in FIG. 4.

Now, an embodiment of the present invention will be described in greater detail with reference to FIGS. 1 to 3.

Figure 1:
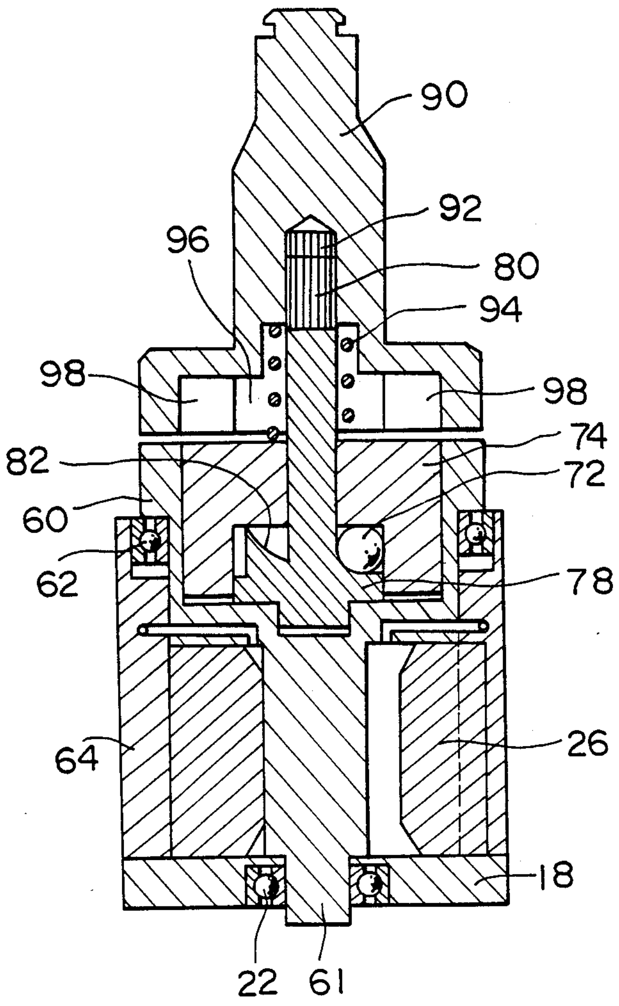
FIG. 1 is a vertical sectional view of a pneumatic impact imparting tool in accordance with an embodiment of the invention, illustrating main components constituting the tool.

FIG. 1 is a vertical sectional view of the main components of a pneumatic impact imparting tool in accordance with an embodiment of the invention. FIG. 2 is a perspective view of a rotor as well as means for converting rotational movement of the rotor into intermittent turning movement of an anvil both of which are shown in a disassembled state. FIG. 3 is a perspective view of the aforesaid means and the anvil both of which are shown in a disassembled state. It should be noted that in FIGS. 1 to 3 the same or similar parts or components as those shown in FIGS. 4 to 7 are identified by the same reference numerals.

A column-shaped rotor 60 has a shaft 61 which projects from its lower end and which is formed with a plurality of grooves 24 extending between its lower end mid-section. As is apparent from FIG. 2, the grooves 24 extend in parallel with the axis of the rotor 60 and a vane 26 is inserted into each of the grooves 24 to slidably move in the radial direction. The rotor 60 is rotatably mounted in the interior of a cylinder 64 through a bearing 62 and the shaft 61 of the rotor 60 extends through a rear plate 18 to be rotatably held thereby. The inner space of the cylinder 64 is so designed that the center axis of the inner space is located offset from the center axis of the outer wall of the cylinder 64. Compressed air is introduced into the inner space of the cylinder 64 by employing a known method so that the rotor 60 is rotated by the thus introduced compressed air.

The rotor 60 has a recess 66 formed on the upper side thereof located opposite to the shaft 61 and the recess 66 has a considerable depth. As shown in FIGS. 2 and 3, a cam member 70, a ball 72 and a follower 74 are accommodated in the recess 66. The cross-sectional shape of the recess 66 is so designed that the follower 74 is snugly accommodated in the interior of the recess 66.

The cam member 70 comprises a rod 76 and a disc-shaped cam 78 located at the lower end thereof both of which are made integral with one another and the upper end part of the rod 76 the cam member 70 is formed with a plurality of spline teeth 80. The cam 78 has a hill portion 82 projected upwardly of the upper surface thereof and a ball 72 is disposed on the upper surface of the cam 78 The follower 74 comprises a column-shaped portion 84 and a pair of integral wings 86 located diametrically on both the sides thereof both and the length of each of the wings 86 is greater than that of the column-shaped portion 84. The distance between the pair of wings 86 is so determined that the disc-shaped cam 78 is accommodated in the hollow space as defined between the wings 86. The column-shaped portion 84 is integrally formed with a projection 88 on the lower side thereof which is adapted to engage the ball 72. Thus, the ball 72 is turnably displaced as the follower 74 is rotated together with the projection 88. Further, a hole through which the rod 76 of the cam member 70 slidably extends is formed along the central axis of the column-shaped portion 84.

As shown in FIG. 1, the cam member 70, the ball 72 and the follower 74 are accommodated in the recess 66 of the rotor 60. For assembly the ball 72 is placed on the disc cam 78, the rod 76 of the cam member 70 is inserted through the follower 74 and the ball 72 is held between the disc cam 78 and the follower 74 (see FIG. 2). With the above-mentioned three components accommodated in the recess 66 of the rotor 60, the spline teeth 80 at the upper end of the rod 76 are positioned outwardly of the recess 66 of the rotor 60.

The anvil 90 is formed with a plurality of internal spline grooves 92 in a central bore which receives rod 76 so that the spline teeth 80 of the rod 76 are fitted into the spline grooves 92 of the anvil 90. Accordingly, the cam member 70 and the anvil 90 are rotated together. As shown in FIG. 1, a spring 94 is interposed between the anvil 90 and the upper face of the follower 74 so that the follower 74 is normally urged away from the anvil 90 under the resilient force of the spring 94. The follower 74 is biased toward the interior of the recess 66 of the rotor 60 with the aid of the spring 94 whereby the ball 72 is held between the follower 74 and the cam 78 of the cam member 70, as shown in FIG. 1. The anvil 90 is formed with a recess 96 on the lower side thereof located opposite to the follower 74 for the purpose of receiving the one end of the spring 94. The recess 96 of the anvil 90 includes two stoppers 98 which project downwardly toward the follower 74.

Next, operation of the pneumatic impact imparting tool of the invention as constructed in the above-described manner will be described below.

As compressed air is introduced into the interior of the cylinder 64, the rotor 60 is rotated in the same manner as the conventional pneumatic impact imparting tool. Then, as the rotor 60 is rotated in that way, the follower 74 fitted into the recess 66 of the rotor 60 is also rotated together with the rotor 60. At this moment the rod 76 of the cam member 70 which extends through the central part of the follower 74 is not rotated together with the rotor 60, because its upper end is fitted into the anvil 90. During rotation of the follower 74 caused by the rotor 60 the projection 88 on the follower 74 abuts against the ball 72 whereby the latter is slidably displaced around the rod 76 of the cam member 70 for planetary movement. As the ball 72 climbs the hill portion 82 of the cam 78, the follower 74 is displaced toward the anvil 90 by means of the ball 72 against the resilient force of the spring 94. Thus, the follower 74 is caused to slide in the recess 66 of the rotor 60 toward the anvil 90 with the result that the upper part of the follower 74 is introduced into the recess 96 of the anvil 90.

Due to the fact that the follower 74 is rotated together with the rotor 60, the upper part of the follower 74 which has been introduced into the recess 96 of the anvil 90 collides against the stoppers 98 on the anvil 90. Then, the anvil 90 is turned by collision of the follower 74 against the stoppers 98. Since arranged so that the ball 72 moves over the hill portion 82 at a time a little before the above-mentioned collision takes place, the follower 74 begins to move back toward the original position in the recess 66 under the effect of the resilient force of the spring 94 immediately after the follower 74 collides against the stoppers 98. As long as the follower 74 is retained in the interior of the recess 66, the anvil 90 is not turned. When the ball 72 climbs the hill portion 82 later again, the same operation as mentioned above is repeated to turn the anvil 90 intermittently.

As will be apparent from the above description, the pneumatic impact imparting toll of the invention is constructed in such a manner that a recess is formed on one end part of the rotor and means for converting rotational movement of the rotor into intermittent turning movement of the anvil is accommodated in the thus formed recess. On the other hand, the conventional pneumatic impact imparting tool including a pneumatic motor and means for converting rotational movement of the motor into intermittent turning movement of the anvil both of which are arranged separately requires that the rotor be airtightly encased by the combination of the cylindrical member, rear plate and front plate in order to prevent leakage of the compressed air which is used for rotating the rotor. Further, there is a need for provision of a cage in which means for converting rotational movement of the rotor into intermittent turning movement of the anvil is accommodated.

In contrast with the conventional pneumatic impact imparting tool, the pneumatic impact imparting tool of the invention is so constructed that means for converting rotational movement of the rotor into intermittent turning movement of the anvil is accommodated in a recess which is formed in one end of the rotor. Thus, there is no need for any front plate and moreover there is no need for the wall portion of the cage. As a result, a thickness corresponding to the front plate and the wall portion of the cage is eliminated and therefore the whole length of the pneumatic impact imparting tool as measured in the axial direction can be reduced remarkably. Further, there is no need for the cage in which means for converting rotational movement of the rotor into intermittent turning movement of the anvil is accommodated. Thus, the number of components constituting the pneumatic impact imparting tool can be reduced and thereby it can be manufactured at an inexpensive cost.

While the present invention has been described above with respect to a single preferred embodiment, it should of cource be understood that it should not be limited only to it but various changes or modifications may be made in a suitable manner without any departure from the spirit and scope of the invention as defined by the appended claims.

What is claimed is:

1. A pneumatic impacting tool comprising:

a pneumatic motor including a cylindrical rotor having an axially extending rotor recess in one end face;

a shaft aligned with the axis of rotation of said rotor and having one end rotatably mounted within said recess in said rotor;

an anvil having an axially extending anvil recess, axially aligned with and opening toward said rotor recess, for receiving the end of said shaft opposite said one end and having, within said anvil recess, (1) shaft receiving means for holding said shaft against rotation relative to said anvil and (2) radially extending impact receiving means;

a follower having a central column portion and a pair of opposing wing portions integral with said column portion, said follower slidably seated within said rotor recess for rotation therewith and mounted on said shaft for reciprocating sliding movement between an anvil disengaged position where said follower is engaged within said rotor recess for rotation with said rotor while said anvil is not rotated and an anvil engaged position where said follower is engaged within both said rotor recess and said anvil recess whereby said anvil is rotated with said rotor;

biasing means for urging said follower into said anvil disengaged position;

camming means, within said rotor recess, for intermittently driving said follower into said anvil recess against the force of said biasing means, said follower striking said impact receiving means by rotation within said anvil recess, thereby generating impacting force.

2. A pneumatic impacting tool in accordance with claim 6 wherein said opposite end of said shaft is splined and wherein said shaft receiving means is an axial bore which opens into said anvil recess and which is splined for engagement with said splines on said shaft.

3. The pneumatic impacting tool of claim 1 wherein said urging means is a spring one end of which is mounted in said anvil recess and the opposite end of said spring bearing against said follower.

4. The pneumatic impacting tool of claim 1 wherein said camming means comprises:

a disk on said one end of said shaft presenting a camming surface facing said anvil;

a ball mounted for rotation around said camming surface; and means, associated with said follower, for driving said ball around said camming surface as said follower is rotated.

5. The pneumatic impacting tool of claim 9 wherein said means for driving said ball is a projection integral with said follower.

* * * * *

UNITED STATES PATENT AND TRADEMARK OFFICE
CERTIFICATE OF CORRECTION

PATENT NO. : 4,867,250

DATED : September 19, 1989

INVENTOR(S) : Akira ONO

It is certified that error appears in the above-identified patent and that said Letters Patent is hereby corrected as shown below:

IN THE CLAIMS:

Col. 8, line 14, "6" should read --1--; and line 31, "9" should read --4--.

Signed and Sealed this

Eighteenth Day of September, 1990

*Attest:*

HARRY F. MANBECK, JR.

*Attesting Officer*

*Commissioner of Patents and Trademarks*